United States Patent
Bach

(10) Patent No.: US 7,841,322 B2
(45) Date of Patent: Nov. 30, 2010

(54) SUPER COOLED AIR AND FUEL INDUCTION SYSTEM FOR INTERNAL COMBUSTION ENGINES

(75) Inventor: Jeff Bach, Gurnee, IL (US)

(73) Assignee: Dynamic Fuel Systems, Inc., Gurnee, IL (US)

(*) Notice: Subject to any disclaimer, the term of this patent is extended or adjusted under 35 U.S.C. 154(b) by 7 days.

(21) Appl. No.: 12/270,195

(22) Filed: Nov. 13, 2008

(65) Prior Publication Data
US 2009/0126691 A1    May 21, 2009

Related U.S. Application Data

(60) Provisional application No. 60/988,539, filed on Nov. 16, 2007.

(51) Int. Cl.
*F02G 5/00* (2006.01)
*F02D 41/26* (2006.01)

(52) U.S. Cl. ........... 123/543; 123/480; 123/526; 123/527

(58) Field of Classification Search ........... 123/1 A, 123/543, 557, 435, 559.1, 480, 27 GE, 525–527; 701/103–105
See application file for complete search history.

(56) References Cited

U.S. PATENT DOCUMENTS

| | | |
|---|---|---|
| 3,141,293 A | 7/1964 | Crooks |
| 3,306,032 A | 2/1967 | Chaffiotte |
| 3,577,726 A | 5/1971 | Wagner |
| 4,078,531 A | 3/1978 | Hewitt |
| 4,471,742 A | 9/1984 | Kishi |
| 4,742,801 A | 5/1988 | Kelgard |
| 4,829,957 A | 5/1989 | Garretson et al. |
| 4,945,880 A | 8/1990 | Gonze et al. |
| 4,953,515 A | 9/1990 | Fehr et al. |
| 4,953,516 A | 9/1990 | vanderWeide et al. |
| 5,140,966 A | 8/1992 | Wong |
| 5,203,305 A | 4/1993 | Porter et al. |
| 5,375,580 A | 12/1994 | Stolz et al. |
| 5,408,978 A | 4/1995 | Davis |
| 6,408,832 B1 | 6/2002 | Christiansen |

(Continued)

OTHER PUBLICATIONS

T. Joyce, The LNG Observer, vol. 1, No. 1 (Spring 1990).

*Primary Examiner*—Hai H Huynh
(74) *Attorney, Agent, or Firm*—McHale & Slavin, P.A.

(57) ABSTRACT

The instant invention provides an apparatus and system for cooling the air charge of an internal combustion engine. More specifically, the instant invention provides an air-induction system suitable to provide cooled air charges to turbocharged, supercharged or naturally aspirated internal combustion engines to increase power output while reducing engine emissions. The system utilizes gaseous fuel stored as a liquid wherein the liquefied gaseous fuel is vaporized and warmed at least partially with heat removed from the intake air charge supplied to the engine from the turbocharger or supercharger. In a preferred embodiment, the compressed intake combustion air is first cooled in an aftercooler against an ambiently cooled coolant and is subsequently cooled further by the chiller of the instant invention which utilizes the change in phase, between liquid and gas, of the alternative fuel to cool the incoming air charge. The fuel, in the gaseous phase, is then supplied to the engine in a controlled manner for combustion by the engine. The operation of this system is measured and controlled by a control box mounted in the engine compartment.

17 Claims, 8 Drawing Sheets

U.S. PATENT DOCUMENTS

| | | |
|---|---|---|
| 6,422,015 B2 | 7/2002 | Long |
| 6,736,118 B1 * | 5/2004 | Velke .................. 123/550 |
| 6,901,889 B1 | 6/2005 | Ritter et al. |
| 7,100,582 B1 | 9/2006 | Bach |
| 7,225,763 B2 | 6/2007 | Ritter et al. |
| 7,389,173 B1 * | 6/2008 | Wang ..................... 701/103 |
| 2003/0097997 A1 | 5/2003 | Lynch et al. |
| 2005/0199224 A1 | 9/2005 | Ritter et al. |
| 2007/0125321 A1 | 6/2007 | Ritter |
| 2007/0157912 A1 | 7/2007 | Ritter et al. |
| 2007/0235010 A1 | 10/2007 | Fluga et al. |
| 2008/0078363 A1 * | 4/2008 | Apperson ............... 123/557 |
| 2009/0071438 A1 * | 3/2009 | Shiraishi et al. ........ 123/403 |

\* cited by examiner

SUPER COOLED AIR AND FUEL INDUCTION SYSTEM FOR INTERNAL COMBUSTION ENGINES

CROSS-REFERENCE TO RELATED APPLICATIONS

This application is related to U.S. Pat. No. 7,100,582, entitled Propane Injection Control System and Apparatus for Vehicles, the contents of which are incorporated herein by reference. This application also claims the benefit under 35 U.S.C. 119(e) of U.S. Provisional Patent Application No. 60/988,539, filed Nov. 16, 2007, entitled SUPERCOOLED AIR INDUCTION SYSTEM FOR INTERNAL COMBUSTION ENGINES, the entirety of which is incorporated herein by reference.

FIELD OF INVENTION

The present invention generally relates to internal combustion engines, and more particularly, to an apparatus and method of super cooling the air charge of an internal combustion engine.

BACKGROUND INFORMATION

For more than a century, internal combustion engines have been relied upon as a principal source of power in a variety of applications. Of those engines, the most widely used are the reciprocating piston engines which are found in automobiles or other forms of transportation, as well as a variety of industrial and consumer applications. Such engines can be built in a variety of sizes, types and configurations depending on the power requirements of a particular application.

Of those variations, Diesel engines have a number of important advantages over gasoline engines. They provide reliability, long life, and good fuel economy, and are expected to remain the dominant heavy-duty transport power plants for several years. Diesel engines typically inject diesel fuel into the engine's combustion chamber when that chamber's piston is near the end of the compression stroke. The high pressure present in the chamber ignites the diesel fuel. Due to the uncontrolled nature of the mixing of diesel and air during combustion, a large fraction of the fuel exists at a very fuel-rich equivalence ratio. That is, the fuel and air in the combustion chamber are not necessarily a homogenous mixture. This typically results in incomplete combustion of the diesel fuel, which tends to result in high particulate emissions. Furthermore, the fuel-rich equivalence ratio can also lead to high flame temperatures in the combustion process, which results in increased NOx emissions. As tougher environmental standards are being enacted for diesel sources, users of diesel engines are looking for ways to lower emissions.

One solution is to reduce the amount of diesel injected into the combustion chamber, which reduces the equivalence ratio and works to reduce particulate and NOx emissions. However, it also reduces engine power.

Another solution is to partially or completely convert the engine for use with alternative fuels such as, compressed natural gas (CNG), liquid natural fuels (LNF) such as ethanol, and liquid or liquefied petroleum gas (LPG) such as propane. Utilization of such alternative fuels with diesel engines not only provides for more complete combustion and thereby enhanced fuel economy, but also typically results in lower engine emissions. However, alternative fuels, and more particularly gaseous fuels, typically do not have the centane value required to allow for their ignition through compression. Accordingly, diesel engines must be modified to use such fuels. Methods for converting a diesel engine to consume alternative fuels typically fall into three categories. The first is to convert the engine to a spark-ignited engine; a second is to convert the engine to allow for the direct injection of gaseous-fuels into the combustion chamber; and a third is "fogging" or "fumigation" of the gaseous-fuel with all or a portion of the intake air charge entering the engine. As will be appreciated, the second and third methods utilize injected diesel (i.e., pilot diesel) to ignite the gaseous-fuel. In this regard, the combustion of the gaseous-fuel results in more complete combustion of the diesel. Furthermore, the combination of gaseous-fuel and diesel allows the engine to produce additional power while less diesel fuel is injected into the cylinders.

However, conversion to a spark-ignition system and/or a direct gaseous-fuel injection system for utilizing gaseous-fuels with a diesel engine each typically require substantial modification to the diesel engine. Such modifications may include replacement of cylinder heads, pistons, fuel injection system and/or duplication of many engine components (e.g., injection systems). Accordingly, these systems are typically expensive and often times unreliable.

On the other hand, fogging or fumigation type dual-fuel systems require little modification to existing engines. The mixture of gaseous-fuel with the intake air charge is introduced into each cylinder of the engine during the intake stroke. During the compression stroke of the piston, the pressure and temperature of the mixture are increased in the conventional manner. Near the end of the compression stroke, a small quantity of pilot diesel fuel from the engine's existing diesel fuel injection system is injected into the cylinder. The pilot diesel ignites due to compression and in turn ignites the mixture of gaseous-fuel and intake air enhancing the burn of the mixture. As will be appreciated, such fumigation systems may be retrofit onto existing diesel engines with little or no modification of the existing engine. Furthermore, engines using such fumigation systems may typically be operated in a dual-fuel mode or in a strictly diesel mode (e.g., when gaseous-fuel is not available). See for example, U.S. Pat. No. 7,100,582, to the instant inventor, entitled Propane Injection Control System and Apparatus for Vehicles, the contents of which are incorporated herein by reference.

Another shortcoming of diesel engines that results in inefficiency and increased emissions relates to supercharging, where an intake air compressor is mechanically driven or driven with exhaust gases from the engine being expanded through a high speed rotary expander to drive a rotary, centrifugal compressor to compress the incoming air charge to the combustion cylinders, e.g. turbocharging. The supercharging or turbocharging of the intake air raises the temperature of the incoming air charge. This heated air adversely affects the performance of the engine by decreasing the density of the intake air charge, and therefore limits the available mass of intake air for a given engine displacement. In addition, a hot intake air charge increases the likelihood of premature detonation of the fuel charge in the cylinders which may damage engine components.

Currently, it is known in the art to increase the performance of supercharged or turbocharged internal combustion engines by cooling the compressed intake air either after the supercharger or turbocharger or even between the supercharger or turbocharger stages. This cooling is most often accomplished by heat exchange with either a recycled cooling medium such as water which then is heat exchanged with an external cooling medium such as air in the case of land-based, stationary power plants or sea water in the case of shipboard power plants or power plants with adequate cooling water supplies, e.g. "charge-cooling". In other instances, the intake air is cooled by heat exchange with surrounding air using a radiator such as a fin and tube heat exchanger, e.g. intercooling or aftercooling. In both these processes, the temperature of the cooled intake air will still be above the temperature of the ambient cooling medium unless additional energy and refrigeration equipment is employed. In the case of a truck, bus, railroad locomotive or stationary engine using ambient air cooling, this cooled intake air will generally be 10 F.° to 20 F.° (approximately 5 C.° to 10 C.°) higher than the ambient air temperature. In summer conditions, this may result in an intake air temperature, even after cooling, of 100 F.° to 120 F.° (38 C.° to 49 C.°) or higher. In other instances, mechanical refrigeration systems have been utilized to achieve controlled cooling of the intake air to desired temperatures substantially independent of ambient temperature conditions. U.S. Pat. Nos. 3,306,032 and 3,141,293 disclose mechanical refrigeration systems for cooling the compressed intake air. However, these systems are complex and require a substantial amount of power for operation of the cooling system.

U.S. Pat. No. 4,742,801 describes apparatus for pumping and vaporizing a cold liquefied gas for fuel to a dual-fueled internal combustion engine and particularly a diesel engine. However, it does not teach the advantage of using the cold liquefied gas to cool the incoming intake combustion air charge.

U.S. Pat. Nos. 6,901,889 and 7,225,763, U.S. Published Patent Applications No. 2005/0199224 and 2007/0125321 disclose using a secondary fuel in a diesel engine. However, none of these publications disclose chilling the air supply to the diesel engine by use of the secondary fuel.

An article by Thomas Joyce in the Spring, 1990 issue of The LNG Observer, Volume 1, No. 1, describes the use of LNG, or liquefied natural gas, as a fuel for an automobile, with an LNG vaporizer mounted in the engine compartment of the automobile utilizing engine coolant to heat and vaporize the LNG. It is also suggested that the refrigeration of the LNG could be utilized to cool the incoming air and to thereby, "in essence, supercharge the engine to boost its power." However, while this article alludes to the cooling effect as providing the equivalent of supercharging, it does not deal with the cooling of compressed and heated intake air resulting from the use of a turbocharger or supercharger, nor does it teach the controlled aftercooling of the compressed intake air to achieve balanced operation of the vaporizer and aftercooler.

Therefore, what is needed in the art is a system and method for cooling the intake air charge of an internal combustion engine with a liquefied fuel that may be supplied to the engine for combustion after vaporization or expansion of the liquefied fuel. The system and method should be suitable for use with supercharged and non-supercharged diesel engines and should improve the combustion of diesel fuel within the combustion chamber of the engine to improve exhaust emissions and reduce fuel consumption. More particularly, the invention should reduce particulate and NOx emissions being expelled from the exhaust by causing a more uniform burning of the diesel fuel. The system should also provide gaseous fuel to a diesel engine based on the varying requirements or demands of the engine. The system should also cool the incoming air charge of the engine sufficiently to increase the volumetric efficiency of the engine.

SUMMARY OF THE INVENTION

Briefly, the present invention is directed toward a system for injecting a secondary fuel to a diesel engine wherein the secondary fuel is also utilized to cool or super cool the incoming air charge to the engine. The preferred embodiment of the propane injector system comprises introducing liquid propane into "a chiller assembly" whereby the incoming air charge passes through the chiller assembly to warm the liquid propane, converting it to a gaseous state as the incoming air charge is cooled. The gaseous propane is then routed to a black box that includes a pressure reducing valve to drop propane pressure as it flows initially from the chiller assembly and through an electronically controlled on/off valve. The gaseous propane enters an injector manifold where it is distributed to at least one, more preferably two, but as many as required, specially designed gas handling fuel injectors that act as variable flow rate injectors controlled by a programmable microprocessor that is pre-programmed for specific vehicles or can be customized with improved performance programming as determined by the vehicle owner. The number of fuel injectors utilized depends on the different size of the engine and fuel system. The only limitation regarding the number of fuel injectors utilized is that there are as many as necessary to provide adequate fuel metering. A pressure feedback system senses when the engine supercharger has caused a pressure boost on its high side feeding the cylinders. Transducers located in a Manifold Absolute Pressure (MAP) sensor detect the pressure boost and communicate with the microprocessor. This intake manifold pressure sensing provides feedback to the processor that controls the fuel injectors to customize the amount of propane being fed to the engine on an "as needed" basis. Information on engine performance is programmed into the computer controller, i.e. microprocessor, to provide the flow rates for the added propane or other alternative fuel. This arrangement maximizes fuel efficiency and minimizes use of the alternative fuel. It should also be noted that other sensors such as knock-sensors, oxygen sensors, throttle position sensors, mass air flow sensors and the like may also be utilized either singly or in combination to supply data to the microprocessor which may be utilized for determining the supply of alternative fuel to the engine.

The components can be provided in the form of a kit which can be added to a vehicle to cool the incoming air charge while fumigating gaseous propane into the incoming air charge of the diesel engine. The cooled propane-fuel-air mixture burns slower, adding power without increasing price or exhaust products that are discharged into the environment. Further, it is possible with the system provided herein to allow diesel engines to idle at stop lights or other stops while operating almost exclusively on propane, thus eliminating the undesirable diesel exhaust emissions that are often found objectionable.

Accordingly, it is an objective of the instant invention to provide a chiller assembly for cooling the incoming air charge of an internal combustion engine utilizing a liquefied gaseous fuel.

It is another objective of the instant invention to provide a chiller assembly that is constructed and arranged to accept propane in a liquid phase for conversion to propane in a gaseous phase, whereby the phase change is utilized to cool the incoming air charge and the gaseous propane is supplied to an internal combustion engine for combustion.

It is yet another objective of the instant invention to provide a chiller assembly that includes an air aperture through the body portion of the chiller for passages of incoming air to the internal combustion engine.

It is still yet another objective of the instant invention to provide a chiller assembly that includes a boiling chamber for converting liquefied propane to gaseous propane and a vapor chamber for collecting the gaseous propane.

Still another objective of the instant invention is to provide a chiller assembly that includes at least one tube and fin for transferring heat from the incoming air to the liquid fuel within the chiller assembly.

Still yet another objective of the instant invention is to provide a method and chiller assembly for cooling the incoming air charge of an internal combustion engine to improve the efficiency and performance of the internal combustion engine.

Still another objective of the invention is to provide a system for treating the exhaust of an internal combustion engine.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENTS

Figure 1:
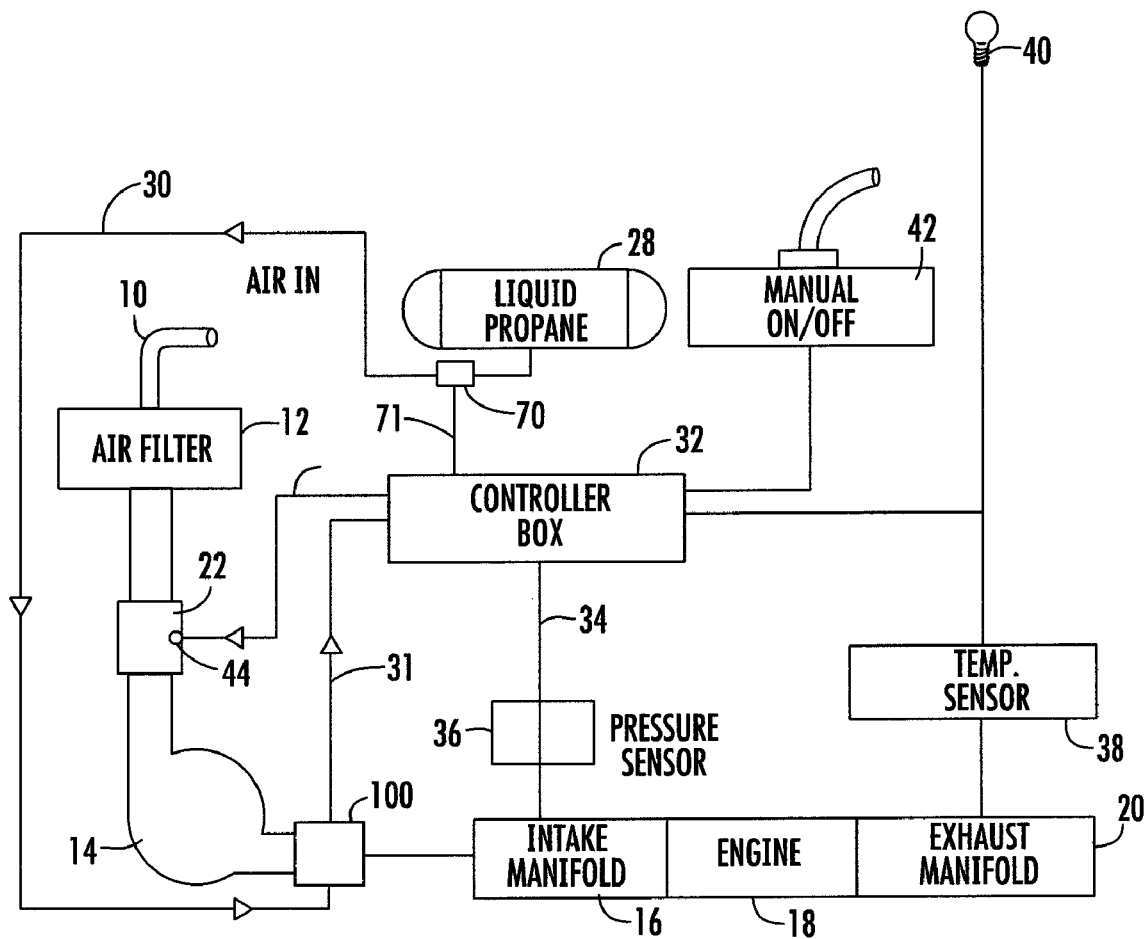
FIG. 1 is a schematic illustration of the chiller assembly incorporated into a dual fuel fumigation type system.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

The different types of internal combustion engines that can be used in conjunction with the supplemental fuel system include but are not limited to diesel engines, internal combustion engines in vehicles, stationary internal combustion engines, internal combustion engines in locomotives, internal combustion engines in marine vessels, and internal combustion engines in aircraft. The supplemental fuels used in conjunction with this system include but are not limited to liquid propane, propane, liquefied natural gas, natural gas, liquid butane, butane, and MAP gas.

Figure 3:
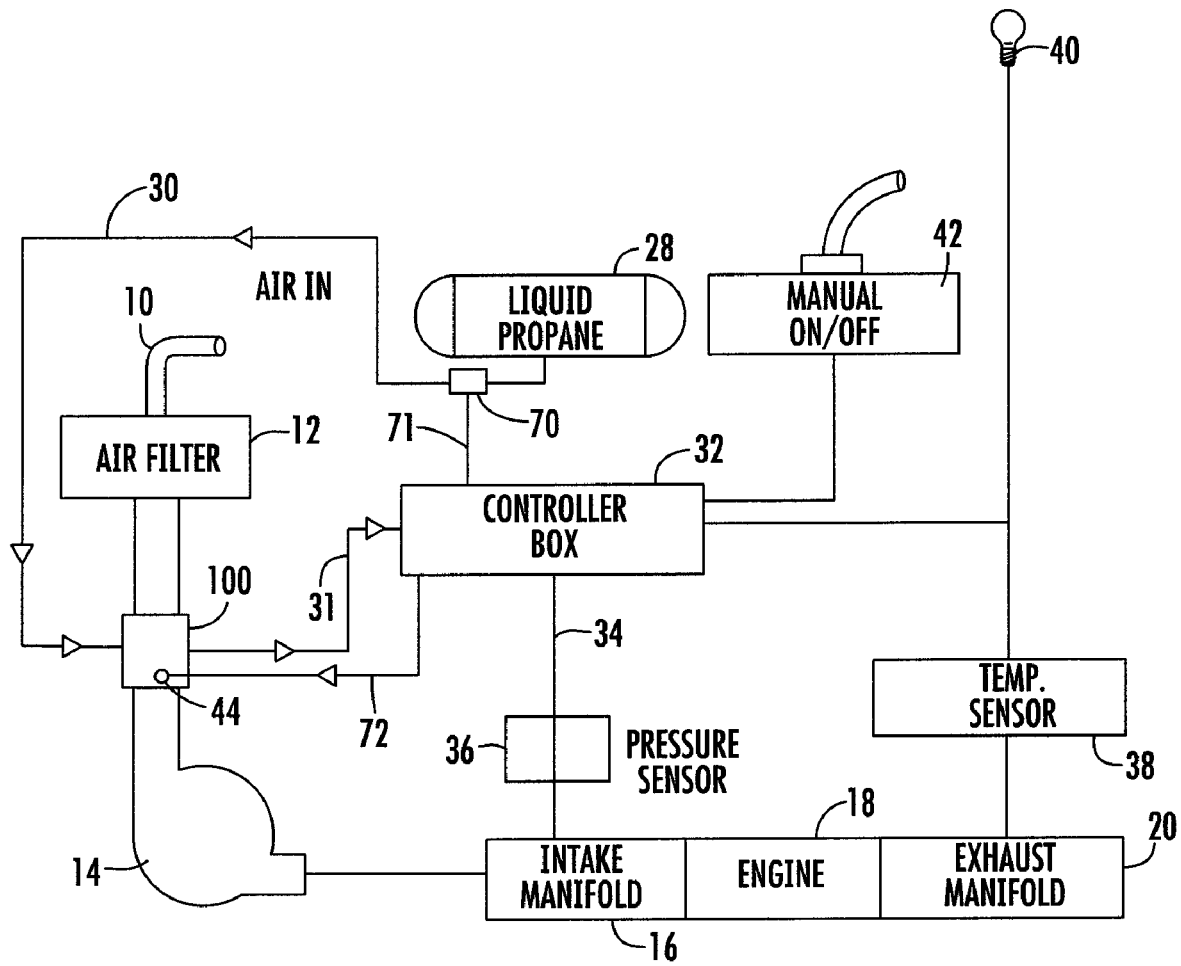
FIG. 3 is a schematic illustration of the chiller assembly incorporated into an alternative dual fuel fumigation type system.

Referring generally to FIGS. 1 and 3, a schematic illustration of the chiller assembly incorporated into various dual fuel fumigation type systems are shown. Referring to FIG. 1, the preferred system includes an air intake 10 and an associated air filter 12 to feed ambient air to a turbo charger 14. Compressed air from the turbo charger is routed to the intake manifold 16 for division and distribution to the various cylinders of the engine 18. Within the engine the air is mixed with diesel fuel and combusted. Thereafter, the combusted fuel/air mixture is pushed into the exhaust manifold 20 for discharge to the atmosphere. A primary feature of this disclosure is to show a combination of parts that may be supplied in a kit form to be easily adapted and attached to an existing vehicle such as a truck, school bus, or even a stationary diesel engine such as those used for providing power to a generator or pump. It should be noted that while the systems illustrated in FIGS. 1 and 3 are both turbocharged systems, the instant invention may be utilized with other types of supercharged and non-supercharged engines utilizing fumigation without departing from the scope of the invention.

Figure 5:
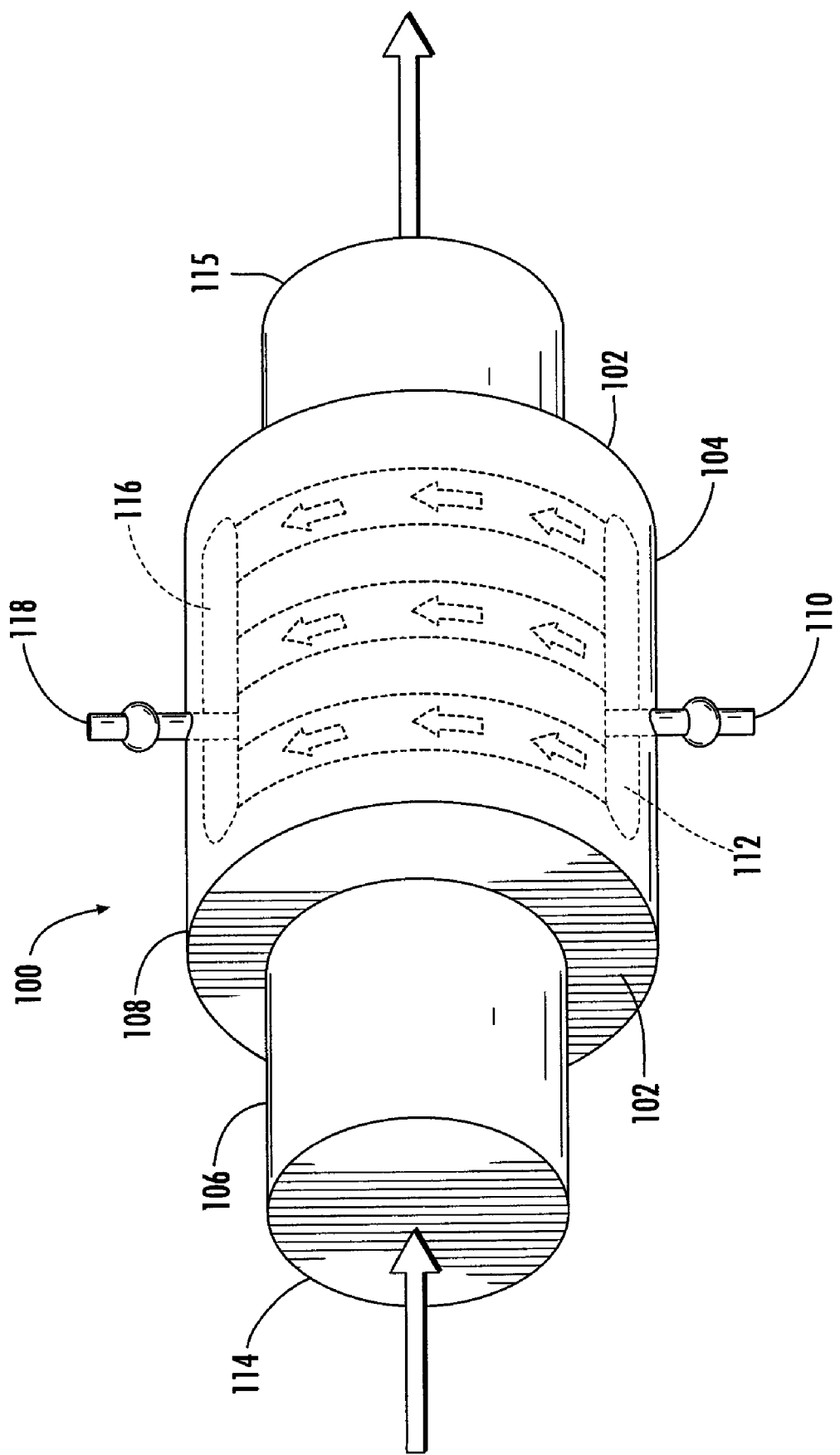
FIG. 5 is a perspective view illustrating one embodiment of the chiller assembly of the instant invention.

Referring to FIG. 5, a perspective view of one embodiment of the chiller assembly 100 is illustrated. The chiller assembly is generally constructed and arranged for placement anywhere along the intake plenum of the engine where the incoming air charge may be routed through at least a portion of the chiller prior to entering the engine. The chiller 100 is generally constructed as an elongated dual walled tubular assembly with sealed ends 102 to form an internal hollow chamber 104. The inner wall 106 is constructed of a heat transferable material such as aluminum while the outer wall 108 may be constructed of any suitable material including an insulating material or may be covered with an insulating material. The outer wall 108 of the hollow chamber 104 is illustrated as transparent so that the transformation of the liquid fuel into a gaseous fuel can be illustrated. Liquid fuel enters the hollow chamber 104 through a nozzle 110 where the liquid fuel settles in a boiling portion 112 of the chamber. Air flowing through the chiller aperture 114 warms the liquid fuel causing the fuel to convert to a gaseous state where it rises to a vapor portion 116 of the chamber 104, as illustrated by the arrows. Air exits the chiller through aperture 115. The gaseous fuel is then routed through a fitting 118 to the regulator (not shown) in the controller 32 (FIG. 1). The chamber 104 and/or the aperture 114 may also include tubes and fins such as those typically used for heat exchangers to aid in the transfer of heat from the incoming air to the liquid fuel.

In a preferred embodiment the chiller 100 is 6 inches in diameter with approximately 2 inch heat exchange tubes (with surface area extruded fins). The end caps could be 3 inches, 3.5 inches, 4 inches or 5 inches depending on the particular application.

Figure 4:
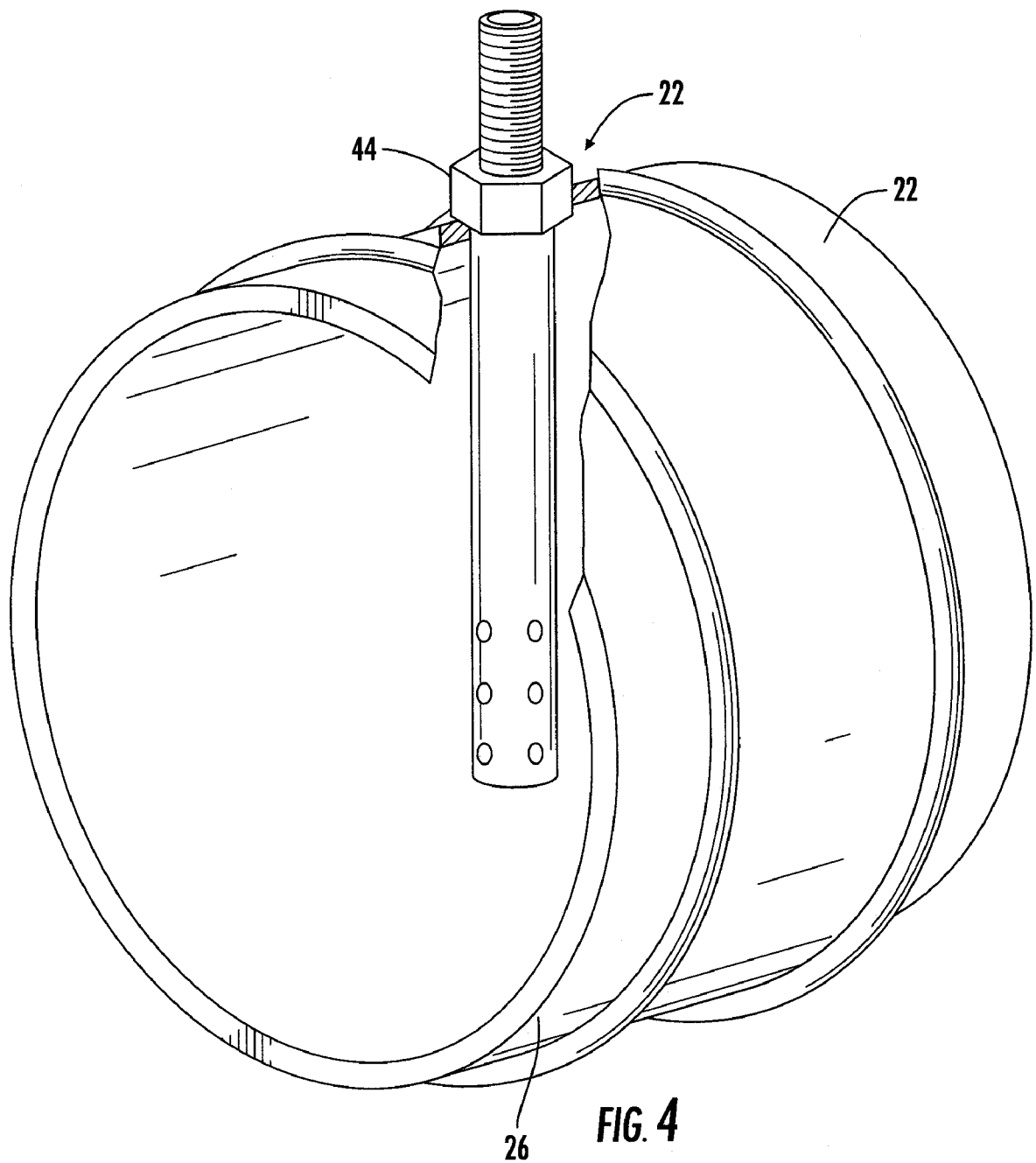
FIG. 4 is a perspective illustration of a fuel ring and gaseous fuel injector suitable for use with the instant invention.

Referring to FIG. 1, a propane line 30 extends from the tank 28 to the chiller 100 for conversion of the fuel from liquid to gas. In addition, line 30 preferably includes a shut-off/diverter valve 70. The shut-off/diverter valve is constructed and arranged to either shut off the flow of propane or to divert the propane between the chiller and the control box. In this manner, temperature sensors (not shown) provided in the intake manifold may be used to provide feedback to the controller box for controlling the flow of fuel to the chiller for controlling the temperature of the air charge entering the engine. Line 31 as well as line 71 extends to the controller box 32 where the fuel pressure is regulated before being routed though line 72 to an adapter ring 22. The adapter ring 22 (FIG. 4) is generally an annular member containing at least one fuel nozzle 44 constructed and arranged to disperse the gaseous fuel to the incoming air charge. A pressure line 34 is attached to a pressure sensor 36 to monitor pressure in the intake manifold 16 to feed propane when the turbo charger 14 increases pressure as the engine 18 speeds up or the load on the engine 18 increases. A temperature sensor 38 is located in the exhaust manifold 20 to monitor exhaust temperatures as a safety feature and shut off the system if temperatures exceed a pre-set level. An indicator 40 is located in a position wherein a driver or operator can be readily notified of a condition of the operation of the internal combustion engine. In a preferred embodiment the indicator is a light and it is connected to the temperature sensor 38 to visually indicate when a predetermined temperature is reached even before the system shuts down automatically. A manual control or shut off switch 42 is located within easy access of the driver or operator so as to be easily reached to manually shut off the system if the light 40 indicates a problem. In another embodiment the indicator 40 could be incorporated within the switch 42.

Figure 2:
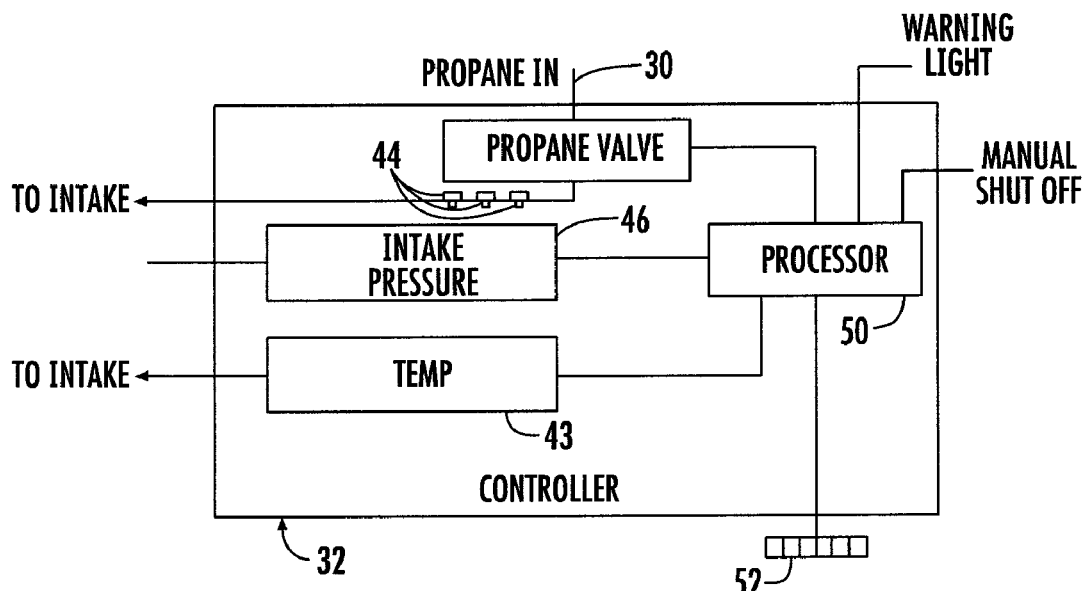
FIG. 2 is a block diagram of the controller shown in FIG. 1.

Referring to FIG. 2, a schematic of the controller or black box 32 is illustrated. This box is a rugged member that contains the regulator valve, temperature sensor 43 and a microprocessor 50. All feedback temperature and pressure sensing lines are preferably located in the control box 32 and provide data to the microprocessor that is evaluated and acted upon based on programming limits as determined by each vehicle. As an example, information will be programmed into the microprocessor based on test data obtained from actual tests on vehicles. If a common type of school bus with a standard engine is evaluated, the data may be stored and used to program other kits that will be installed in the same type of bus with the same engine configuration. Since the kit provides an adaptor or common connector 52 for connecting to a laptop computer for programming and evaluation, the field work is performed quickly, reliably and without dismantling the fuel system. The system preferably operates on standard 12 V DC.

In addition, the controller 32 could shut down the entire engine in the event that a component of the system failed. In addition to shutting down the system it would generate a code in the engine control module (ECM) memory which can be downloaded and read by a scan tool or similar device at a later time. A malfunction indicator lamp (MIL) can be incorporated into the shut off switch 42 or stand by itself on the vehicle, preferably within the vehicle cab. The regulator valve in the controller or black box 32 can also be mounted on the vehicle separately from the controller 32.

Referring to FIG. 3, an alternative embodiment of the chiller assembly 100 is illustrated. In this embodiment, the chiller assembly is mounted in the intake air plenum prior to the supercharger 14. The chiller assembly is constructed substantially the same as the embodiment illustrated in FIG. 5 with the exception that the gaseous fuel injector 44 is mounted with in the chiller so that as the air charge passes through the chiller, the gaseous fuel is injected into the passing air.

The kit form allows the conversion to be completed in a simple and economical fashion. The propane injection may occur on the low pressure or the high pressure side of the blower by simply attaching a short tubular member having the injector installed therein, with the propane line attached, to the flexible hose providing air to the blower. The temperature sensor is attached to the exhaust manifold by drilling and tapping into the manifold. The black box (controller) 32 is attached inside the engine compartment, or even in the drivers cab and a propane tank of suitable size is attached to the vehicle in a space of suitable size.

The control box 32 preferably includes a connection 52 (FIG. 2) for communication with a laptop computer that performs system diagnostics. After the engine is started, the system is monitored with software that measures flow of propane, engine exhaust temperature, intake manifold pressure, intake manifold absolute pressure (utilizing a vacuum signal), mass airflow, throttle position and air temperature. The chiller 100 includes sensors for air pressure, inlet temperature and outlet temperature. The engine exhaust temperature is measured utilizing a sensor mounted within the exhaust of the engine. The system is then monitored for performance during a range of engine operation. Once this data is loaded into a laptop, other systems can be pre-programmed to match the performance characteristics of the initial prototype or set up engine. If field tests determine that the engine and system can be improved, the system can be monitored during real time operating conditions to customize the settings on the system to optimize performance or operation to user specifications. In addition to connection 52 on the controller box a vehicle data connector, such as an OBD II, connector can be used to download and obtain vehicle engine data. The engine data could be real time data and/or data stored in memory. This data can be used to calibrate the controller 32 and to write fuel maps. The real time data can include real time fuel consumption, intake air temperature (for chiller adjustment or chiller auto calibration or a continuous learning mode), temperature adjustment for optimum emission control, oxygen sensor data, exhaust gas temperature (for reference and comparison), vehicle speed, accelerator command signals and additional data which can be used to calibrate the flow of the secondary fuel, such as propane, to the chiller.

The data obtained from the various engine sensors enable the engine to be programmed for optimum efficiency, optimum emission control and engine protection. The real time date stream from the engine enables the engine to be controlled to provide the most efficient fluke economy, the lowest exhaust gas temperature, and optimum intake air temperature by controlling the chiller 100. In addition to the data being used to control the engine, a cell phone or satellite phone could incorporated into the system and employed to communicate with the engine. This type of communication would enable real time data to be sent from vehicles anywhere in the world to the factory/manufacturer of the supplemental fuel induction system and super cooled air induction system. This would enable the manufacturer to assist in the auto calibration of the system and the diagnostics of problems with the system. The exhaust temperature sensor can also be used to shut down an exhaust regeneration cycle on a diesel engine after the cycle is complete and the proper exhaust temperature has been reached.

A module could be placed in the cab of the vehicle in place of the shut off switch 42. This module would control the system in an on/off mode, a manual adjustment mode, an auto calibration mode, and a continuous self learn mode. Further the module in the cab could display the engine fault codes, the miles per gallon in real time, the chiller temperature, the fuel level, and the mode of operation of the system i.e. normal operation, manual adjustment, auto calibration, continuous learn and factory access in progress. The adjustments and map files which are provided by the factory/manufacturer are engine, vehicle and application specific. The adjustments and map files provided by the factory/manufacturer provide a hug advantage over other systems that are currently available to the consumer. Control of the secondary fuel and other parameters is provided by proprietary software available only from the factory/manufacturer. This type of control enables the system to increase the horsepower and torque or program the system for economy without exceeding the OEM horsepower and torque and thus maintaining the engine/vehicle warranty.

Figure 6:
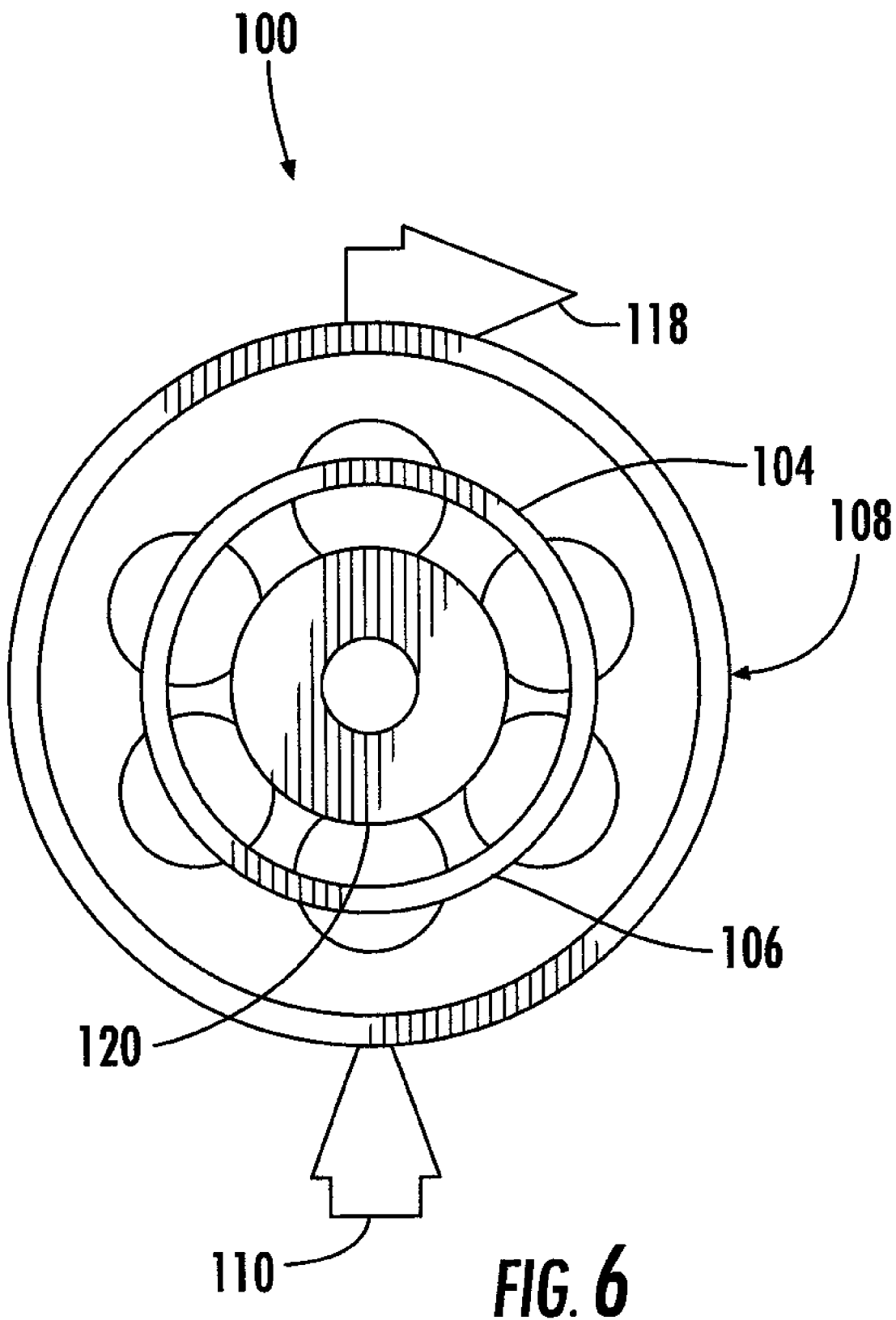
FIG. 6 is a cross section of the chiller in FIG. 5.

FIG. 6 illustrates a first embodiment of chiller 100. FIG. 6 is a cross section of the chiller 100 illustrated in FIG. 5. The chiller 100 is generally constructed as an elongated dual walled tubular assembly with sealed ends to form an internal hollow chamber 104. The inner wall 106 is constructed of a heat transferable material such as aluminum while the outer wall 108 may be constructed of any suitable material including an insulating material or may be covered with an insulating material. The outer wall 108 of the hollow chamber 104 is illustrated as transparent so that the transformation of the liquid fuel into a gaseous fuel can be illustrated. Liquid fuel enters the hollow chamber 104 through a first inlet or nozzle 110 where the liquid fuel settles in a boiling portion of the chamber. Air flowing through the chiller aperture 114 or second inlet warms the liquid fuel causing the fuel to convert to a gaseous state where it rises to a vapor portion of the chamber 104. Air exits the chiller through aperture 115 or first outlet. The gaseous fuel is then routed through a fitting 118 to the regulator (not shown) in the controller 32 (FIG. 1). A deflector 120 in the air inlet ensures the uniform distribution of the incoming air for even cooling of the air. The chamber 104 and/or the aperture 114 may also include tubes and fins such as those typically used for heat exchangers to aid in the transfer of heat from the incoming air to the liquid fuel.

Figure 7:
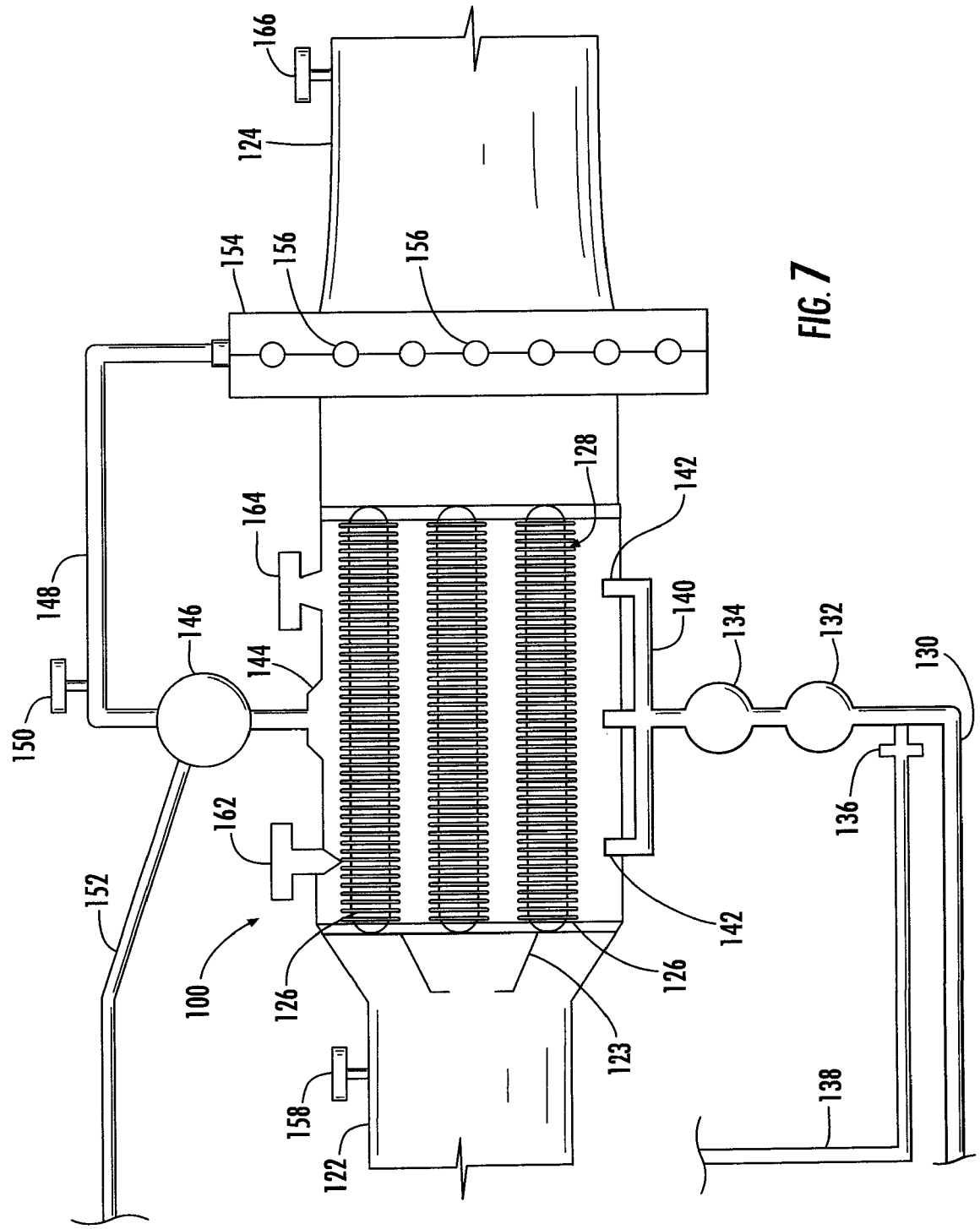
FIG. 7 is another embodiment of the chiller.

FIG. 7 illustrates another embodiment of chiller 100. In this embodiment air enters the chiller at 122 and exits the chiller at 124. The temperature of the air exiting the chiller is lower than the temperature of the air entering the chiller. The air passes through the chiller through passages or tubes 126. An air deflector 123 evenly distributes the incoming air into the passages 126. These passages can optionally be supplied with fins 128 to assist in the transfer of heat from the air to the supplemental fuel.

Supplemental fuel is supplied to the chiller through line 130. A liquid flow meter 132 is located in line 130 to measure the flow rate of the liquid fuel. An on/off switch 134 is also located in the line 130 to permit or stop the flow of liquid fuel into the chiller. A bypass valve 136 is located in line 130 to bleed off or send excessive liquid fuel back to the liquid fuel supply through line 138. An optional manifold 140 distributes the liquid fuel into the chiller. Nozzles 142 are located on the outlet of the manifold 140 to evenly distribute the liquid fuel into the chiller. The liquid fuel is heated in the chiller. The liquid fuel changes state to a gas or vapor by indirect contact with the incoming air. The incoming air is in turn chilled or cooled to a temperature lower than the temperature of the incoming air.

The gaseous fuel leaves the chiller at outlet 144. A pressure regulator 146 controls the pressure of the gaseous fuel. The gaseous fuel then passes into line 148. A pressure sensor 150 measures the pressure of the gaseous fuel in line 148. The pressure sensor can control the pressure regulator 146. Optionally a line 152 can supply liquid fuel to the pressure regulator from by pass line 138 or supply of liquid fuel.

The gaseous fuel is sent to the injector ring 154 from line 148. The injector ring contains one of more injectors 156. These injectors introduce the gaseous supplemental fuel into the air which is then supplied to the internal combustion engine. Temperature sensor 158 measures the temperature of the air entering the chiller. Temperature sensor 160 measures the temperature of the air exiting the chiller. Temperature sensor 162 measures the temperature of the fuel in the chiller. Pressure sensor 164 measures the pressure of the fuel in the chiller.

Figure 8:
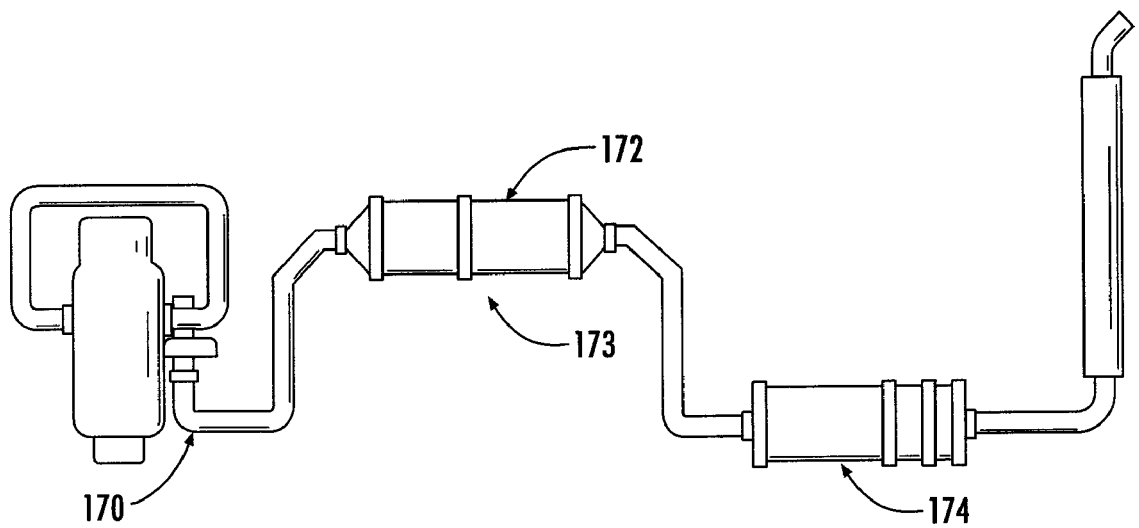
FIG. 8 is a first embodiment of a supplemental fuel system for treating the exhaust of an internal combustion engine.

FIG. 8 illustrates the treatment of the exhaust of an internal combustion engine with a supplemental fuel. Liquid or gaseous supplemental fuel in introduced into the exhaust system at 170. A catalytic convertor 172 is located downstream of the fuel introduction point 170. The supplemental fuel chemically reacts with the catalyst to produce heat at 173. The heat is transferred to the particulate exhaust filter 174 which assists in burning the excess particles captured in the particulate filter 174.

Figure 9:
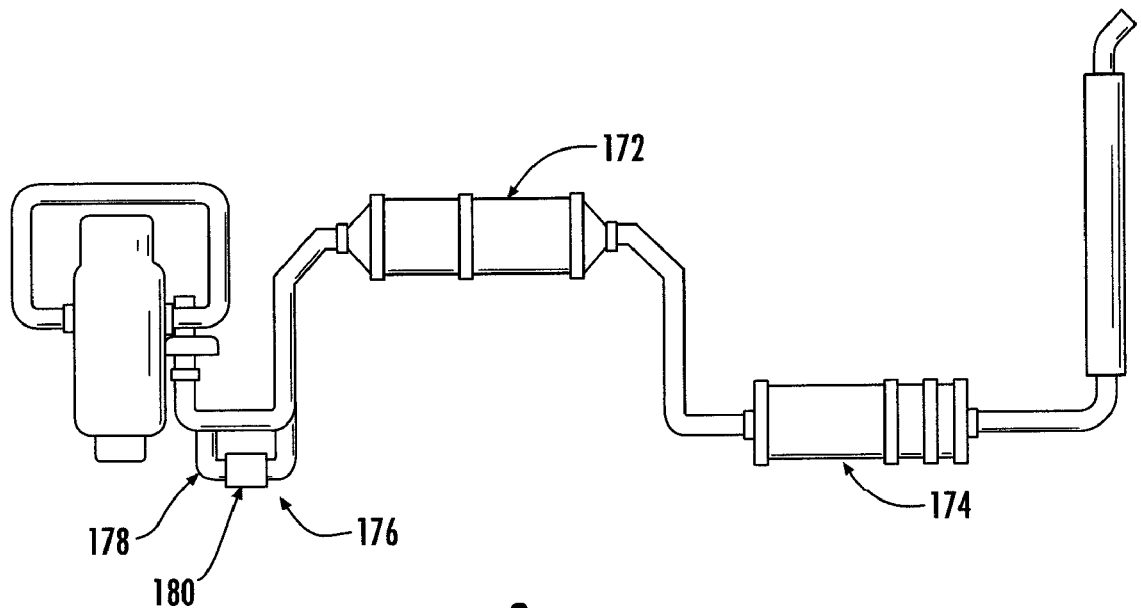
FIG. 9 is another embodiment of a supplemental fuel system for treating the exhaust of an internal combustion engine.

FIG. 9 illustrates another embodiment of the treatment of the exhaust of an internal combustion engine. A bypass 176 is placed in the exhaust system. Liquid or gaseous supplement fuel is introduced into the exhaust at 178. Another catalyst 180 is located in the bypass 176. The catalyst produces heat which is used to burn the excessive particles in the particle filter 174.

Figure 10:
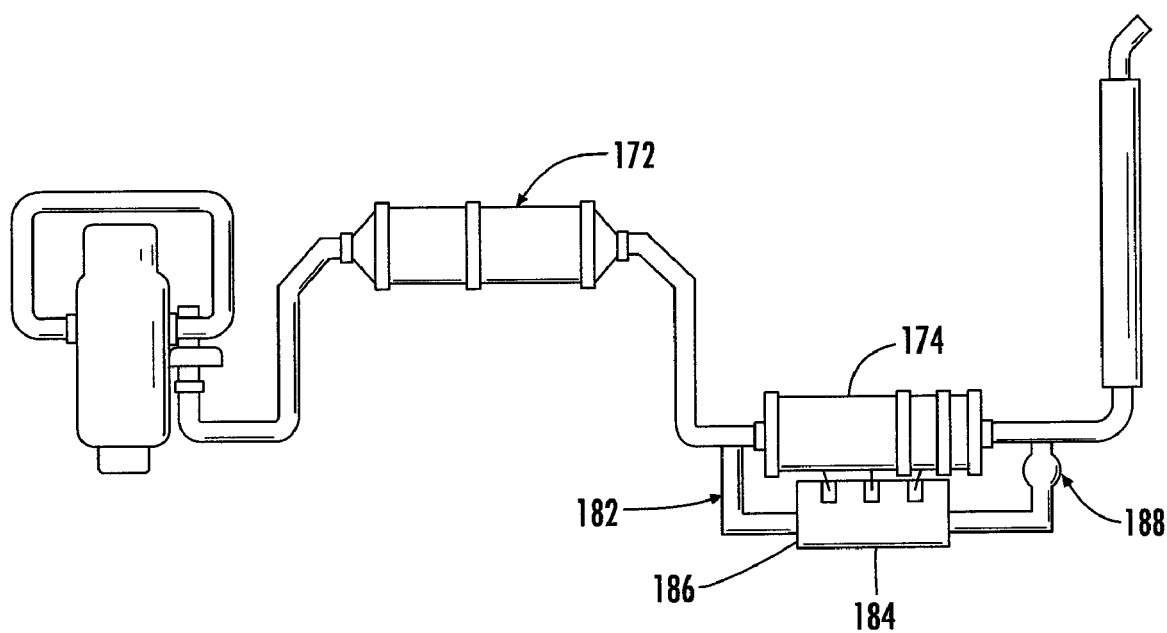
FIG. 10 is another embodiment of a supplemental fuel system for treating the exhaust of an internal combustion engine.

FIG. 10 illustrates another embodiment of the treatment of the exhaust of an internal combustion engine. A bypass 182 bypasses the particulate filter 174. The exhaust is typically oxygen rich. Liquid or gaseous supplemental fuel is introduced into a supplemental fuel heater 184 at 186. The heater 184 heats the particulates in the particulate filter 174 and burns off these particles. A supplemental fuel catalyst 188 is located downstream of the heater 184. This catalyst eliminates any excess hydrocarbons that may be present in the exhaust.

Operation of one embodiment of the supplemental fuel system will now be described. The system is energized and determines if the engine is operating via oil pressure, engine rpm and/or various other inputs form the engine control module (ECM). The system then performs a self check and if everything is satisfactory enters into a functional mode. The functional mode can be Auto Calibration, Manual Programming and/or System operational. These modes are controlled by the distributor/installer on site via a lap top computer or remotely via satellite through a web site by authorized personal.

Liquid supplemental fuel enters the pulse turbine liquid flow meter via the liquid line from the supply tank. The flow meter determines the amount of liquid fuel being consumed accurately within = or –½ percent. This input is sent to the controller and is used as a failsafe, in case of an external or internal leak or stuck open or closed injector or faulty regulator. By monitoring the flow at different given rpms and engine loads the amount of liquid fuel that should be consumed can be accurately predicted. This can be entered into a table in the software. In the event the flow is out of parameters on the table the unit shuts down and displays on the control panel. The liquid flow meter is also useful for monitoring the exact amount of liquid fuel consumed to determine accurate savings calculations for the customer.

From the liquid flow meter the fuel travels to the cycle switch bank. Multiple cycling switches are used as yet another fail safe. The system will monitor the switches (coil resistance) and in the event of a failure the secondary cycling switches can function normally and prevent over flow to the chiller unit and ultimately shut down the fuel flow if need be. The main function of eh cycling switches is to maintain certain pressures in the chiller unit. As pressure and temperature are relevant in refrigeration processes this permits full adjustability with the controller and sensors to maintain a requested steady air temperature for the programmed into the software.

From the cycling switches the liquid fuel enters the chiller unit via the liquid fuel manifold and spray orifices. As the liquid fuel enters the chiller assembly pressure vessel, latent heat of vaporization takes place. The liquid fuel vaporizes with the heat from the fresh air passing through the heat exchange tubes mounted in the chiller. Through firmware and software the pressure and temperature are controlled in the chiller. Inputs from the sensors on the chiller (temperature and pressure) as well as inlet and exiting air temperature sensors determine this.

The vaporized fuel exits the chiller and enters a regulator. The regulator ensures that the liquid fuel will never pass through as well as maintains a steady pressure feed of vaporized fuel to the injector ring or injector block. A pressure sensor is utilized to ensure that the regulator is doing its job and maintaining the requested adjusted pressure.

Vaporized fuel now passes via the vapor line to the injector ring or the injector block. This pressurized fuel is now metered into the incoming air stream as dictated by the software. The amount of fuel injected is determined by an array of sensor inputs including but not limited to turbo boost, throttle position, exhaust gas temperature, engine load, oxygen sensor, instantaneous fuel consumption (mpg or gallons per hour), engine rpm, etc.

The controller will have the ability to interface with data link connectors on a variety of application to provide valuable inputs to the controller such as vehicle speed, engine rpm, engine load, fuel consumption, coolant temperature, location of the vehicle and many others. This information can be used in conjunction with the chiller sensors by the controller to determine the air temperature for the chiller to achieve as well as amount of fuel to be injected for emissions economy.

The display unit will provide the operator or driver with useful information such as system function, exhaust gas temperature, shut down fault code information, maintenance intervals, supplemental fuel level in the storage tank, etc. The display unit is also the on/off switch for the engine. This could be a light emitting diodes (LEDs) display sensor touch (bells and whistles).

A hydrocarbon sensor could be utilized in marine applications to determine if and when fuel has leaked and settled into the hull of the marine vessel.

The typical regeneration cycle for a diesel particulate filter (DPF) must raise the exhaust temperature high enough to sufficiently burn the particulates trapped in the DPF. This is accomplished in many different ways. The most common is by utilizing engine controls. When a diesel engine is richened up (more fuel less oxygen) the combustion temperatures and ultimately the exhaust gas temperature increases. This can be achieved by electronically controlling the throttle plates on a diesels engine and over fueling. By restricting the amount of air and injecting excessive amounts of fuel creates heat. This can be accomplished by injecting fuel late as to cause combustion in the exhaust. Combustion in the exhaust can be achieved by engaging an engine brake while fueling. The main objective is to apply heat to the DPF to burn off the soot.

One embodiment involves injecting LPG or supplemental fuel before an upstream catalyst to generate high exhaust temperatures. These upstream catalysts are now used with diesel fuel to achieve this effect. Should the system run out of supplemental gas or LPG, the system would revert back to using diesel fuel to achieve the same result. This system is monitored by OEM software or aftermarket software.

Another embodiment utilizes a separate exhaust circuit with a separate catalyst strictly for LPG or supplemental fuel use. The LPG or supplemental fuel is injected in liquid or vapor form via a by pass circuit. This super hot exhaust gas is the routed to the particulate filter for regeneration cycles.

Another embodiment utilizes a completely separate heating device mounted and incorporated with the particulate filter. Utilizing by pass exhaust this heater can be activated during regeneration cycles and the exhaust from the heater can be routed through an additional catalyst, if required, to eliminate and hydrocarbon or carbon monoxide gases generated from the burning process.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

I claim:

1. A supplemental fuel injection system for internal combustion engines comprising:
    a supply of primary fuel;
    a device supplying said primary fuel to an internal combustion engine;
    an air compressor supplying air to said internal combustion engine;
    a pressure monitor in an air outlet side of said air compressor, said pressure monitor monitoring the pressure of air leaving said air compressor;
    a temperature sensor in an exhaust of said internal combustion engine, said temperature sensor measuring the temperature of said exhaust of said internal combustion engine;
    a device supplying supplemental fuel to said air prior to said air entering said internal combustion engine; and
    a control device controlling the device supplying supplemental fuel, said control device including a programmable microprocessor connected to said device supplying supplemental fuel to vary the amount of supplemental fuel on an as needed, customized and pre-programmed basis for said internal combustion engine; said device supplying said supplemental fuel to said air includes a heat exchanger, said heat exchanger having a first inlet supplying said supplemental fuel in liquid form to said heat exchanger, a first outlet removing said supplemental fuel in a gaseous form from said heat exchanger, a second inlet supplying said air to said heat exchanger and a second outlet removing said air from said heat exchanger at a temperature lower than the temperature of said air entering said heat exchanger, said air exiting from said heat exchanger entering said internal combustion engine.

2. The supplemental fuel injection system of claim 1 including a supplemental fuel injector positioned downstream of said air exiting from said heat exchanger and upstream of said internal combustion engine.

3. The supplemental fuel injection system of claim 1 wherein said heat exchanger is located upstream of said air compressor.

4. The supplemental fuel injection system of claim 1 wherein said heat exchanger is located downstream of said air compressor.

5. The supplemental fuel injection system of claim 1 including a module positioned within reach of a operator of a vehicle, said module communicating with said programmable microprocessor to vary the amount of said supplemental fuel in a mode, said mode consisting essentially of an on/off mode, a manual adjustment mode, an auto calibration mode and a continuous learn mode.

6. The supplemental fuel injection system of claim 5 including an indicator adjacent said operator, said indicator indicating a problem with the operation of said internal combustion engine.

7. The supplemental fuel injection system of claim 5 wherein said module indicates various operating parameters of said internal combustion engine.

8. The supplemental fuel injection system for an internal combustion engine of claim 1 wherein said amount of said supplemental fuel is for treatment of said exhaust of said internal combustion engine.

9. A kit for adding a secondary fuel system to an internal combustion engine comprising:
   an air compressor supplying air to said internal combustion engine;
   a pressure monitor in an air outlet side of said air compressor, said pressure monitor monitoring the pressure of air leaving said air compressor;
   a temperature sensor in an exhaust of said internal combustion engine, said temperature sensor measuring the temperature of said exhaust of said internal combustion engine;
   a device supplying supplemental fuel to said air prior to said air entering said internal combustion engine; and
   a control device controlling the device supplying said supplemental fuel, said control device including a programmable microprocessor connected to said device supplying said supplemental fuel to vary the amount of supplemental fuel on an as needed, customized and pre-programmed basis for said internal combustion engine; said device supplying said supplemental fuel to said air includes a heat exchanger, said heat exchanger having a first inlet supplying said supplemental fuel in liquid form to said heat exchanger, a first outlet removing said supplemental fuel in a gaseous form from said heat exchanger, a second inlet supplying said air to said heat exchanger and a second outlet removing said air from said heat exchanger at a temperature lower than the temperature of said air entering said heat exchanger, said air exiting from said heat exchanger entering said internal combustion engine.

10. The kit of claim 9 including a supplemental fuel injector positioned downstream of said air exiting from said heat exchanger and upstream of said internal combustion engine.

11. The kit of claim 9 wherein said heat exchanger is located upstream of said air compressor.

12. The kit of claim 9 wherein said heat exchanger is located downstream of said air compressor.

13. The kit of claim 9 including a module positioned within reach of a operator of a vehicle, said module communicating with said programmable microprocessor to vary the amount of said supplemental fuel in a mode, said mode consisting essentially of an on/off mode, a manual adjustment mode, an auto calibration mode and a continuous learn mode.

14. The kit of claim 13 including an indicator adjacent said operator, said indicator indicating a problem with the operation of said internal combustion engine.

15. A supplemental fuel injection device comprising;
   a heat exchanger, said heat exchanger having a first inlet supplying supplemental fuel in liquid form to said heat exchanger, a first outlet removing said supplemental fuel from said heat exchanger in a gaseous form, a second inlet supplying air to said heat exchanger and a second outlet removing said air from said heat exchanger at a temperature lower than the temperature of said air entering said heat exchanger, said air exiting from said heat exchanger entering an internal combustion engine; and
   at least one injector supplying said gaseous supplemental fuel to said air exiting said heat exchanger.

16. The kit of claim 13 wherein said module indicates various operating parameters of said internal combustion engine.

17. The supplemental fuel injection device of claim 16 including a module positioned within reach of a operator of a vehicle, said module communicating with said programmable microprocessor to vary the amount of said supplemental fuel in a mode, said mode consisting essentially of an on/off mode, a manual adjustment mode, an auto calibration mode and a continuous learn mode.

* * * * *